Patented Dec. 13, 1938

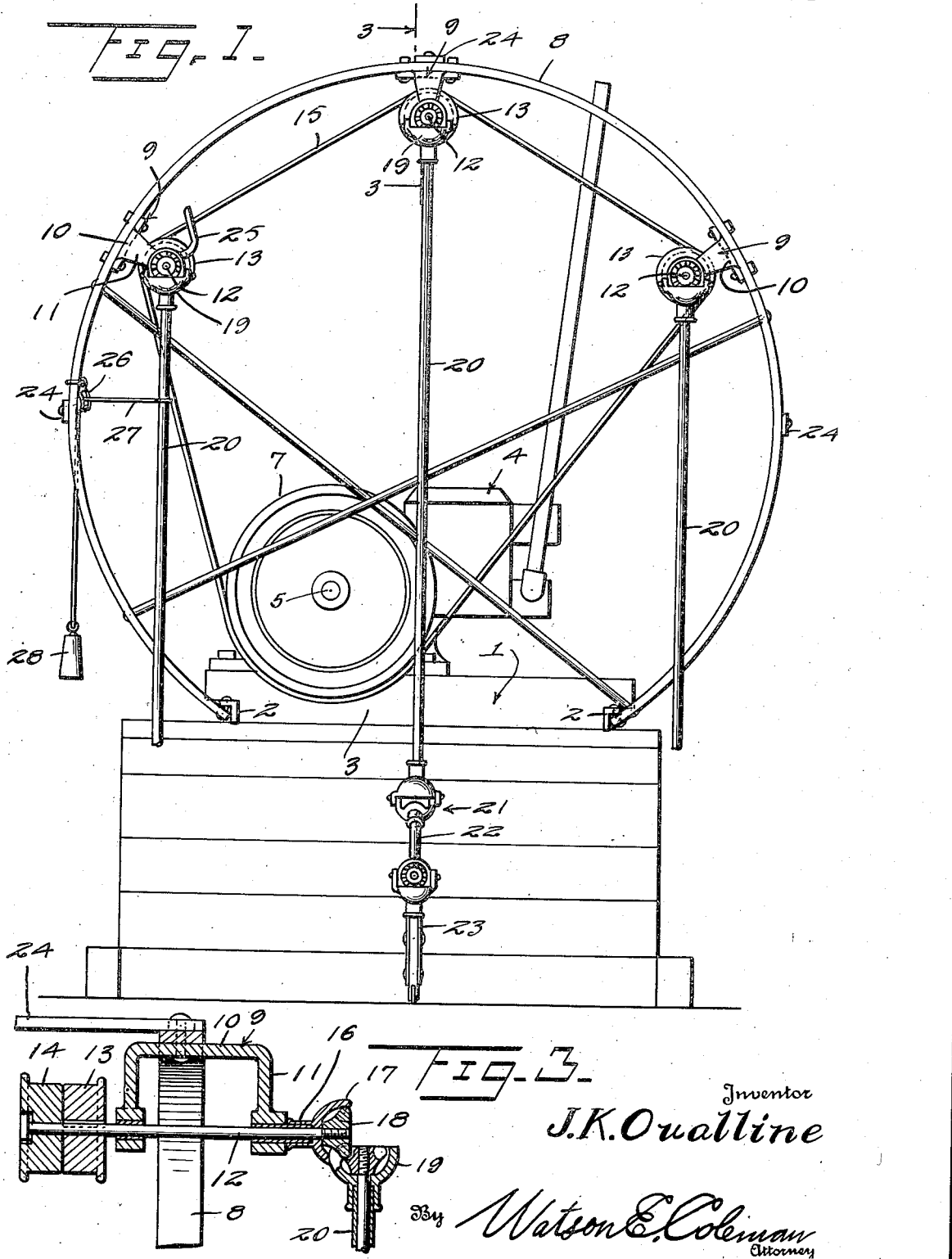

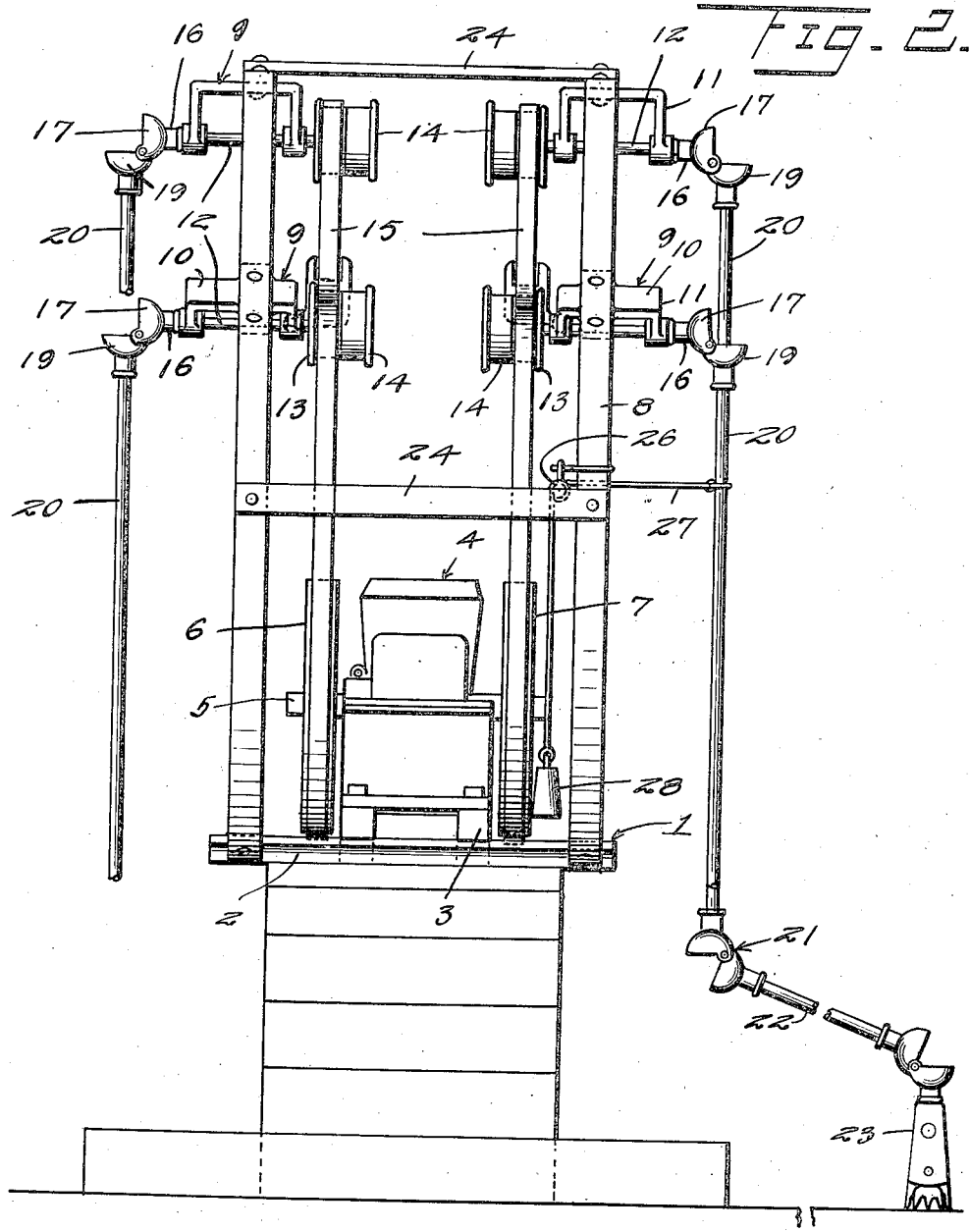

2,139,846

UNITED STATES PATENT OFFICE 2,139,846

SHEARING MACHINE

Jack K. Oualline, Uvalde, Tex.

Application August 6, 1936, Serial No. 94,697

2 Claims. (Cl. 74—223)

This invention relates to machines for use in the shearing of animals.

The primary object of the present invention is to provide an improved animal shearing machine wherein a novel means is employed for transmitting power directly from the power or driving wheel of an engine to a group of drops, through the medium of a single driving element.

In shearing machines of the character at present in use the usual structure comprises a driving engine mounted upon a truck or similar movable structure, a line shaft carrying a plurality of pulleys, a driving connection between the engine and the line shaft, and a plurality of driving connections between the line shaft and the cutters or clippers. These present structures are cumbersome and make use of a large number of belts and pulleys which also require the use of a large number of bearings.

The present invention has for a further object to provide an improved compact shearing machine structure consisting of an engine mounted upon a readily movable base, a frame disposed adjacent the engine, a series of pulleys arranged upon said frame in the same vertical plane and on a substantially circular path and a single driving belt which couples together the drive wheel of the engine and the several pulleys whereby all of the pulleys and the drop units employed therewith will be driven through a single driving belt.

Another object of the invention is to provide an improved compact form of shearing machine wherein two circular frames are mounted upon a readily movable base with the driving engine between the frames and upon the base and wherein each frame carries a series of pulleys arranged in the same plane with the driving wheel upon the engine whereby a single belt connection between the series of pulleys upon each frame and the adjacent driving wheel can be employed for transmitting power to drops leading to the shearing devices from each of the belt pulleys.

The invention will be best understood from a consideration of the following detailed description taken in connection with the accompanying drawings forming part of this specification, with the understanding, however, that the invention is not confined to any strict conformity with the showing of the drawings but may be changed or modified so long as such changes or modifications mark no material departure from the salient features of the invention as expressed in the appended claims.

In the drawings:—

Figure 1 is a view in side elevation of the machine embodying the present invention;

Figure 2 is an end elevation of the same;

Figure 3 is a sectional view on the line 3—3 of Figure 1.

Referring now more particularly to the drawings wherein like numerals of reference designate corresponding parts throughout the several views, the numeral 1 indicates a suitable supporting base for the power plant employed for operating the several clippers which will hereinafter be more specifically referred to. This base is here illustrated as consisting of a pair of beams 2 arranged in spaced parallel relation and having disposed thereacross the steel beams 3 upon which the engine structure, which is indicated as a whole by the numeral 4, is mounted. While any suitable type of engine may be employed, there is here shown more or less conventionally, an engine of the internal combustion type having a drive shaft 5 on which is mounted the usual fly wheel 6 and which has mounted thereon upon the opposite side of the engine body from the fly wheel the extra wheel 7. The fly wheel 6 is also employed as a pulley for transmitting power from the drive shaft to take-off units or drops as hereinafter described.

The transverse base bars 2 extend outwardly a substantial distance beyond the sides of the engine and upon each side of the engine there is disposed the vertically arranged hoop 8 which is riveted or otherwise suitably secured to the ends of the beams 2 in the manner illustrated. Each of these hoops constitutes a supporting frame for a series of hangers, each of which is indicated generally by the numeral 9, and each of which comprises, as shown, a body portion 10 which is riveted directly to the hoop and a pair of arms 11 which are radially directed toward the center of the hoop and which carry suitable bearings at their ends for the support of a pulley shaft 12 which is disposed within the hoop and transversely thereof as illustrated.

Each of the short shafts 12 carries upon its inner end, which is the end disposed between the hoops, a driven pulley 13 and an idler 14. The driven pulley is, of course, keyed to the shaft 12 and all of the driven pulleys associated with a frame or hoop 8 are arranged in the same vertical plane and on the plane of the adjacent wheel 6 or 7 so that a single driving connection in the form of a belt 15 may pass around each group of driven pulleys and the associated driving wheel to receive power from the engine.

The outer depending arm 11 of each unit 9 is provided with a short sleeve 16 which encircles the outer end of the pulley shaft 12 and houses in the enlarged outer end thereof which is indicated by the numeral 17, a suitable beveled gear 18. Connected with the enlarged end portion 17 of each pulley shaft encircling sleeve, is a similarly formed housing 19 which is coupled with a tubular casing 20 which houses a power transmitting shaft (not shown). This shaft has a suitable gear upon each of its ends, one of which gears couples with the gear 18 while the other is connected with a similar gear at the power transmitting joint which is indicated generally by the numeral 21 from which a second shaft sleeve or tube 22 leads to the clipper 23. The details of the power transmitting mechanism leading from the gears 18 of the several units 9 are not specifically described or illustrated as these are of well known construction and in themselves form no part of the present invention.

The hoops or frames 8 may be braced in any suitable manner so as to maintain their upright position upon the base bars 2 and they are here shown as having cross connecting bars 24 between them.

From the foregoing it will be readily apparent that a compact easily shifted or transported shearing machine has been developed in which a gang of three clippers may be operated if desired by shifting the belt of the other gang laterally onto the idler pulleys 14 or, if found desirable, six clippers may be employed by coupling both of the belts with the respective wheels 6 and 7. Shifting of the belts onto the idler pulleys may be accomplished through the medium of the shifting forks 25 which may be rockably mounted upon the adjacent unit arm 11 in any suitable manner.

The numeral 26 designates a hanging pulley which is attached to the hoop 8. Through this pulley a cable or rope 27 is passed which has one end tied to the adjacent shaft housing or sleeve 20 while its other end has attached thereto a weight 28. By this means the upper or hanging portion of the flexible driving mechanism leading from a pulley shaft 12 to the clipper 23 will be constantly drawn inwardly so as to normally maintain its vertical position. This weight acts as a counterbalance for the upper sleeve 20 and thus assists the operator in the moving of the flexible driving connection, during the shearing operation.

From the foregoing it will be readily apparent that six sheep shearers may operate in a small area with a machine embodying the present invention and due to the compact arrangement of the mechanism the same may be transported to the working area and lifted onto any stationary support thus freeing the carrying truck for the machines, for other uses. As previously stated, the machines of the character at present in use are permanently mounted upon the transporting trucks and, therefore, the trucks can only be employed for transporting the shearing machines and must remain idle during the carrying out of the shearing operations.

I claim:—

1. In a shearing machine structure, an engine including a power shaft and a fly wheel mounted on the shaft, a base for said engine, a vertically disposed hoop frame secured to the base at the side of the engine adjacent the fly wheel, a plurality of units secured in spaced relation to the inner side of said hoop frame and each comprising a pair of arms directed radially inwardly from the frame, a stub shaft rotatably supported by the arms and a pulley upon one end of the stub shaft, said pulleys of the units being disposed in the same vertical plane with and above said fly wheel, a single driving belt connection encircling the pulleys and the fly wheel for transmitting power from the wheel to the pulleys, and a plurality of flexible power take-off shafts each operatively coupled at one end with a stub shaft.

2. In an animal shearing machine of the character described, a power unit including a driving shaft and a pair of wheels carried thereby, a supporting base for said power unit including a pair of transversely extending beams having their ends projecting beyond the sides of the unit, a pair of hoop frames disposed vertically with said power unit therebetween, said frames being rigidly secured to the adjacent ends of said beams, a plurality of power receiving units secured to each of said hoop frames and each including a stub shaft and a pulley on the stub shaft, the pulleys of the units of each hoop frame being disposed in the same vertical plane with the adjacent one of said wheels, a belt drive coupling each series of pulleys of each group of frames with the adjacent wheel, a flexible shaft operatively connected at one end with each of said stub shafts, and a power receiving unit operatively coupled with the other end of each of said shafts to be driven thereby.

JACK K. OUALLINE.